United States Patent
Persson

(10) Patent No.: US 7,269,510 B2
(45) Date of Patent: Sep. 11, 2007

(54) DEVICE AND CARRIER OF MAP INFORMATION DATA

(75) Inventor: Johan Persson, Göteborg (SE)

(73) Assignee: Idevio AB, Gothenburg (SE)

( * ) Notice: Subject to any disclaimer, the term of this patent is extended or adjusted under 35 U.S.C. 154(b) by 166 days.

(21) Appl. No.: 10/502,134

(22) PCT Filed: Jan. 21, 2003

(86) PCT No.: PCT/SE03/00085

§ 371 (c)(1),
(2), (4) Date: Feb. 14, 2005

(87) PCT Pub. No.: WO03/062753

PCT Pub. Date: Jul. 31, 2003

(65) Prior Publication Data

US 2005/0165548 A1   Jul. 28, 2005

(30) Foreign Application Priority Data

Jan. 21, 2002   (SE) ................... 0200167

(51) Int. Cl.
*G01C 21/28* (2006.01)
*G01C 21/00* (2006.01)
*G06F 17/30* (2006.01)

(52) U.S. Cl. ..................... 701/212; 701/208
(58) Field of Classification Search ............ None
See application file for complete search history.

(56) References Cited

U.S. PATENT DOCUMENTS

| | | | |
|---|---|---|---|
| 5,968,109 A * | 10/1999 | Israni et al. ............... 701/208 |
| 6,208,997 B1 * | 3/2001 | Sigeti et al. ............. 707/104.1 |
| 6,282,489 B1 | 8/2001 | Bellesfield et al. | |
| 6,337,693 B1 | 1/2002 | Roy et al. | |
| 6,535,872 B1 * | 3/2003 | Castelli et al. ............... 707/3 |
| 6,650,326 B1 * | 11/2003 | Huber et al. ............... 345/428 |

* cited by examiner

*Primary Examiner*—Michael J. Zanelli
(74) *Attorney, Agent, or Firm*—Marshall, Gerstein & Borun LLP

(57) ABSTRACT

Device (1) and carrier for providing map information data (3) interactively to a display unit (5). The device (1) comprises a processor (7) and a memory (9) comprising a map information database (11) comprising map information data (3) representing geographical features, the map information data (3) being based on aggregations of at least one of nodes (15), links (17) and rings (19), each one of which corresponding to geographic features. The map information data (3) of a higher resolution level comprises additional map information data, resulting in more detailed map information (3) presented on the display unit (5), compared to the map information data (3) of a lower resolution level. The map information data (3) of a higher resolution level is generated by enhancement of the map information data (3) of a lower resolution level combined with the additional data, the enhancement being based on disaggregation of nodes (15), links (17) and rings (19). The processor (7) is configured for receiving a request for map information data (3); and providing map information data (3). Also, a device for providing map information data to a planning apparatus (33) for planning at least one of locations of society facility and travel routes is disclosed.

9 Claims, 3 Drawing Sheets

DEVICE AND CARRIER OF MAP INFORMATION DATA

TECHNICAL FIELD OF INVENTION

One aspect of the present invention relates to a device for providing map information data interactively to a display unit operated by a user.

Another aspect of the present invention relates to a map information data carrier to be used in a device for providing map information data.

Yet another aspect of the present invention relates to a device for providing map information data to a planning apparatus for planning at least one of locations of society facility and travel routes.

BACKGROUND OF INVENTION

Digital maps are now finding their way to the public. We see them at many sites at Internet, in PC atlases, in handheld navigators, for instance of the GPS type, and in many other devices. Most data is geographically related and can therefore be presented at a map.

Digital map data is either in raster or vector form. Raster maps are easy to use in applications since they have a uniform data structure where each pixel represents a color or a natural feature class but they have many disadvantages compared to vector maps. The most obvious one is that they do not scale well since images turn blocky when zoomed. They also cannot contain extra information on features in the image. Vector maps on the other hand are more complex to use but offer more flexibility and contain more information.

Geographic databases can be very large and slow to access. Many geographic databases take several gigabyte of storage. Because of their complexity and size these databases are not used to the extent that they may deserve.

Preparation of data for a map application is a costly process. The most common technique today is to prepare one database for each presentation scale that the application uses. This makes it possible to see an overview of a large area without reading most of the database. The downside is of course that it is expensive and complex to handle several databases instead of one. Ideally one database would be efficient enough for the whole scale range that the application uses.

SUMMARY OF INVENTION

Automatic map information data generalization, or aggregation, is a promising ongoing field of research where the result is a number of resolution levels, each in a certain scale. The generalization process consists among other things of selecting the features that are suitable for a certain scale (or resolution level), simplifying geometry of features and replacing some features with a different representation.

Automatic map information data generalization leads to databases presenting resolutions at a plurality of levels. A multi-resolution database, which is one of the central parts of the present invention, has the ability to return data in the resolution that the user requests. Not only should such a database be more efficient when requesting low resolution data than if requesting the original resolution, it should also be able to return a representation that is more suitable for the scale. One example is that cities could be represented by points at low resolutions and with polygons at high resolutions.

One aspect of the present invention relates to a device for providing map information data interactively to a display unit operated by a user. Key hardware elements of the device include a processor and a memory comprising a map information database, or the multi-resolution database. The map information database comprises map information data representing geographical features. The map information data is based on aggregations of at least one of nodes, links and rings, each one of which corresponding to geographic features.

The structure of the node-link-ring approach is the following. A node can be seen as a point, or coordinate, related to at least one geographical feature. A link can be seen a line, even though the present invention also encompasses more advanced geometrical arrangements such as arcs, having nodes in each of its end points. A ring should be interpreted as a circular arrangement or a polygonal arrangement. Also the arrangements also have to be closed. A ring is constituted by a plurality of links. Thus the internal structure of the approach is that the most basic component of the approach is the node, followed by a link followed by a ring. Data, such as points, starting points, ring points, i.e. concerning the three components are stored. Also, attributes to a node, a link, or a ring are possible. Also it is possible that attributes are defined in higher level objects related to rings, links and nodes. An attribute can be seen as a descriptor in relation to a for instance a point. An attribute can comprise a name, a distance between two points, altitude.

Combined with additional data, nodes, links and rings comprise all the necessary information that is needed to increase the resolution of the map information. What nodes, links and rings that will be provided by the device depend on the level of aggregation that corresponds to a resolution level. Thus, aggregations offer a number of resolution levels, where the map information data of a higher resolution level comprises additional map information data, resulting in more detailed map information presented on the display unit, compared to the map information data of a lower resolution level. The map information data of a higher resolution level is generated by enhancement of the map information data of a lower resolution level combined with the additional data, the enhancement being based on disaggregation of at least one of the nodes, links and rings. The processor being configured for:
receiving from the user a request for map information data;
providing to the display unit, in the case of the request being a first request, map information data at a predetermined resolution level and, in the case of the request being subsequent request, map information data at a higher resolution level. It should be pointed out that disaggregation also includes line resolution enhancement.

A key advantage of the present invention is that it makes multiple databases for different scales obsolete. Other advantages include a higher speed in the communication of map information data due to that less map information data is communicated as compared to prior art map information data communication techniques. Another advantage is a reduction of the cost for preparation and communication of map information. It also leads to a decreased need of storage space since the map information data requires less storage space.

According to one preferred embodiment the predetermined resolution level corresponds to the lowest resolution level. This offers the opportunity of allowing a user to start the use of the device at a level having the lowest resolution.

According to another embodiment the processor is further configured for, in the case of the request being subsequent request, providing map information data at a lower resolution level. This offers the opportunity of allowing a user to go back, i.e. to receive map information data of a level of lower resolution.

According to another embodiment, in the case of the request being subsequent request, the difference in resolution level between a presently provided map information data and a previously provided map information data is 1, or greater than 1. This offers the opportunity of a user not to obtain map information data relating to a resolution level of which the user has no interest, i.e. it makes it possible to "jump over" one or more resolution levels. However, the device is arranged to disaggregate the nodes, links, and rings at each level in order to provide the map information data to be provided to the display unit.

In another embodiment the device further comprises communication means in order to communicate map information data to a more distant location. In such an embodiment the memory comprising the map information database is remotely located and accessible using the communication means. This offers the advantage of having easier updating of the map information of a map information company.

In another embodiment the database is arranged in memories at two locations, in which lower resolution levels are arranged in one memory and higher resolution levels are arranged in the other. This offers the exemplary advantage of user's to have a specific map information data as a starting point in the user's use process. As the map information data becomes more specific the required map information data is provided from a second device comprising a second memory comprising the map information database including higher resolution levels.

In another embodiment the display unit is constituted by a computer screen, i.e. the device and display unit is incorporated in the concept called personal computer.

In other embodiments the device further comprises means for communication between the device and the display unit and the display unit is constituted by one of a cell phone, personal digital assistant (PDA), and a navigator. These applications include providing map information data to a mobile setting. One present type of navigator is a GPS navigator. Another type of setting is the providing of map information data using a data communication network, such as the internet, to user. This includes the term internet maps.

Another aspect of the present invention is a carrier, such as a CD-ROM (CD ROM) or a portable drive, comprising the map information database, i.e. a map information data carrier to be used in a device for providing map information data, comprising a map information database comprising map information data representing geographical features. The map information data is based on aggregations of at least one of nodes, links and rings, each one of which corresponding to geographic features, offering a number of resolution levels. The map information data of a higher resolution level comprises additional map information data, resulting in more detailed map information presented on the display unit, compared to the map information data of a lower resolution level. The map information data of a higher resolution level being generated by enhancement of the map information data of a lower resolution level combined with the additional data, the enhancement being based on disaggregation of at least one of the nodes, links and rings. This aspect is highly relevant in the context of so called a CD-Atlas (or CD Atlas). By using the carrier in relation to a computer the map information database is easily available. This aspect is closely related to the first aspect is therefore not described further here.

Yet, another aspect of the present invention deals with a device for providing map information data to a planning apparatus for planning at least one of locations of society facility and travel routes. The device comprises the same hardware components as the first device presented above. However, a chief difference is that the device is not arranged to provide the map information data to a display unit, but rather a planning apparatus. The structure of the map information database is the same, i.e. the map information data is based on aggregations of at least one of nodes, links and rings, each one of which corresponding to geographic features. Therefore the description is limited in these respects. The processor is configured for:

receiving from the user a request for map information data;
providing to the planning apparatus, in the case of the request being a first request, map information data at a predetermined resolution level and, in the case of the request being subsequent request, map information data at a higher resolution level.

A key advantage of this aspect is that it makes facilitates an easy and reliable way of providing map information data to a planning apparatus. For instance the device according to this aspect can be an important tool in terms of planning of locations of society facility, such as where to locate super markets, hospitals, and the like. Also it can be used to plan roads stretches and the like. Another important use of the device according to this aspect is the planning of travel routes since the attributes of the node-link-ring approach can comprise distance data between two points in the geographical dimension.

The database using the node-link-ring approach is developed in the following way.

1. Read original geographic vector data for a region and clip it to that region.
2. Create a set of data with lower resolution and store it.
3. Create supplemental data so that these together with the lower resolution data can recreate the original data and store it separately.
4. Repeat the process from step 1 for all regions comprised in the database.
5. Read one or more adjacent regions at resolution R and separate in a lower resolution and in supplemental data for recreation of resolution R. Store the supplemental for each of the read regions. Join the clipped objects at the borders and store the low-resolution data in the database.
6. Repeat step 5 for all regions at the current resolution in the database.
7. Repeat from step 5 with a lower resolution until the lowest required resolution is reached.

Lexical Section

The term cell phone is here considered to include cell phone, cellphone, cellular phone, mobile telephone and mobile phone.

The term geographical (geography) is here considered to include topographical (topography), topological (topology) and demographical (demography).

The term map information data is here considered to include river, lake, sea, city, part of city, such as a suburb, building, house, road, street, railroad, canal, forest, area under cultivation, mountain, and altitude indicator.

Also included in the term map information data are the contents of the attributes that convey information to the map information data. Types of attributes include name, symbols, such as flags, distance e.g. between nodes, map line features, such as thickness and structure (e.g. dashed line), population, and different types of forests.

BRIEF DESCRIPTION OF THE DRAWINGS

The disclosure of the present invention is supported by use of the following drawings.

DESCRIPTION OF PREFERRED EMBODIMENTS

Figure 1:
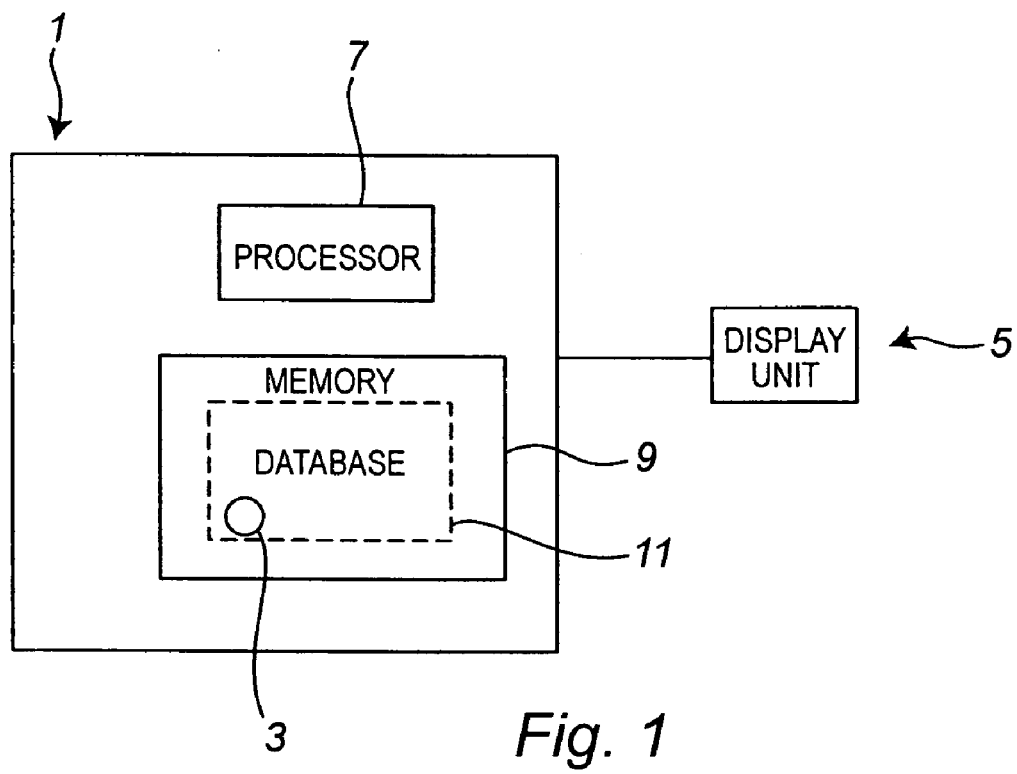
FIG. 1 schematically presents an embodiment of a device for providing map information data interactively to a display unit operated by a user.
Figure 2:
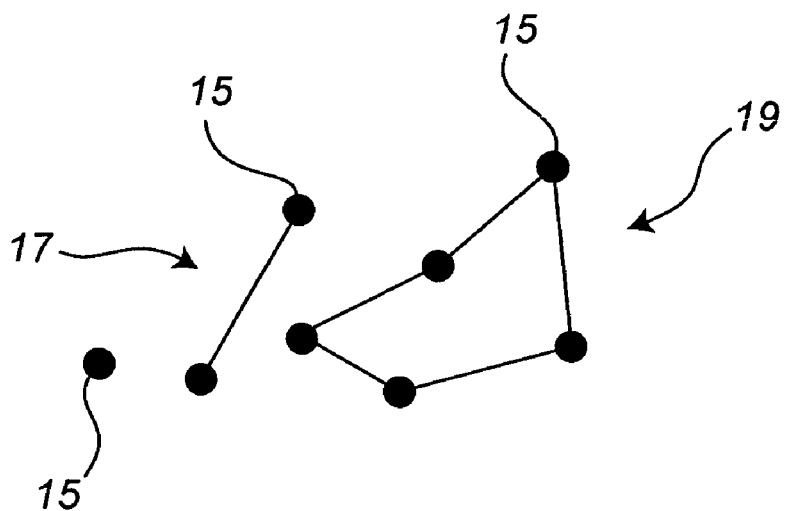
FIG. 2 schematically presents a node, a link and a ring.

In FIG. 1, a device 1 for providing map information data 3 interactively to a display unit 5 operated by a user is presented. The device 1 comprises a processor 7 and a memory 9 comprising a map information database 11. The map information database 11 comprises map information data 3 representing geographical features. The map information data 3 is based on aggregations of at least one of nodes 15, links 17 and rings 19, each one of which corresponding to geographic features. The structure of the node 15, links 17 and rings 19 offer a number of resolution levels. In FIG. 2, examples of a node 15, a link 17, and a ring 19 are presented. As can be seen in FIG. 2, a ring 19 consists of a number of related links 17 and nodes 15, and a link 17 consists of two connected nodes 15.

In one preferred embodiment, there are attributes, as described above, associated with the nodes 15, links 17 and rings 19.

The map information data 3 of a higher resolution level comprises additional map information data, resulting in more detailed map information data 3 presented on the display unit 5, compared to the map information data 3 of a lower resolution level.

The map information data 3 of a higher resolution level is generated by enhancement of the map information data 3 of a lower resolution level combined with additional data. The enhancement is based on disaggregation of at least one of the nodes 15, links 17, and rings 19. The processor 7 is configured for:

receiving from the user a request for map information data 3;

providing to the display unit 5, in the case of the request being a first request, map information data 3 at a predetermined resolution level and, in the case of the request being subsequent request, map information data 3 at a higher resolution level.

In a preferred embodiment the predetermined resolution level corresponds to the lowest resolution level being a geodata level. In a preferred embodiment the processor 7 is further configured for, in the case of the request being subsequent request, providing map information data 3 at a lower resolution level.

On a preferred embodiment, in the case of the request being subsequent request, the difference in resolution level between a presently provided map information data 3 and a previously provided map information data 3 is 1, or greater than 1. This leads to the possibility of the user to obtain map information data 3 at a desired level without having to wait for the communication of the map information data 3 related to resolution levels that the user is not interested to obtain. However, the processor 7 disaggregates the map information of the intermediate resolution levels but they are not provided to the display unit 5.

Figure 3:
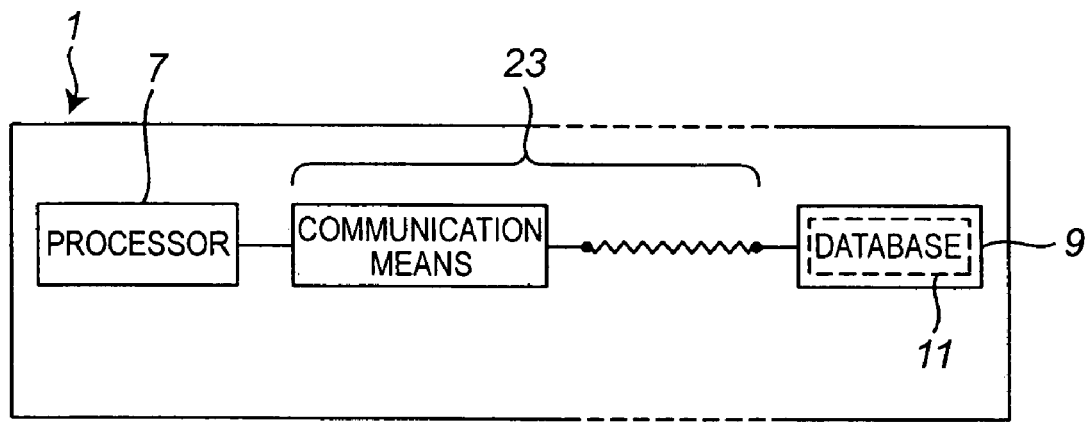
FIG. 3 schematically presents another embodiment of a device for providing map information data interactively to a display unit operated by a user.

In a preferred embodiment presented in FIG. 3, the device further 1 comprises communication means 23 and wherein the memory 9 comprising the map information database 11 is remotely located and accessible using the communication means 23. In this embodiment the communication means 23 is constituted by a data communication network.

Figure 4:
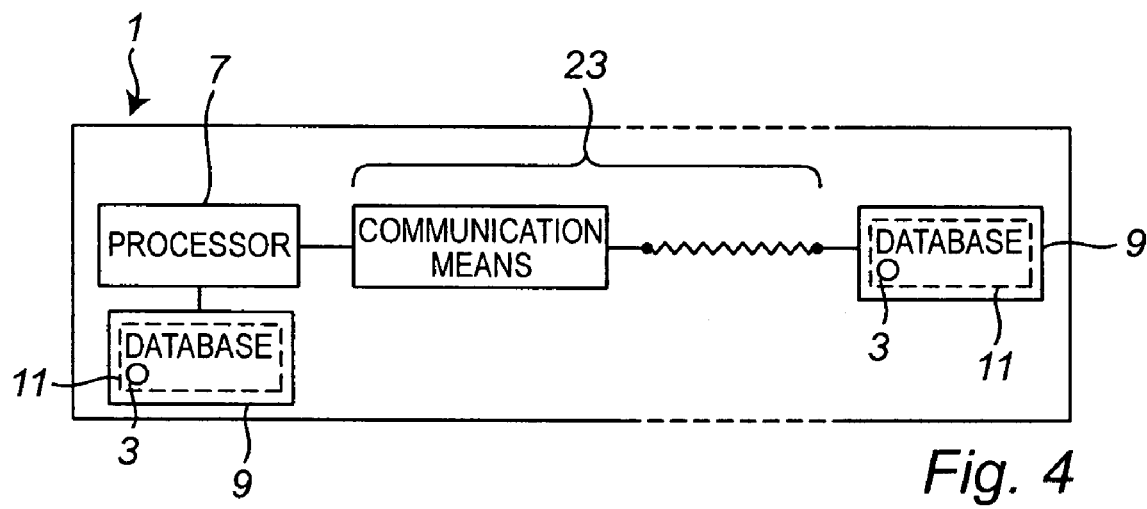
FIG. 4 schematically presents another embodiment of a device for providing map information data interactively to a display unit operated by a user.

In a preferred embodiment, the database 11 of the device 1 is arranged in memories 9 at two locations, in which lower resolution levels are arranged in one memory 9 and higher resolution levels are arranged in the other memory 9. This is presented in FIG. 4.

In a preferred embodiment the display unit 5 is constituted by a computer screen.

In other preferred embodiments of the device 1 comprising means for communication 23 between the device 1 and the display unit 5, where the display unit 5 is constituted by one of a cell phone, personal digital assistant (PDA), and a navigator, i.e. the device 1 is technically applicable in a cell phone, personal digital assistant (PDA), and a navigator.

In one embodiment a map information data carrier to be used in relation to a device 1 for providing map information data 3 is hereby disclosed. It comprises the map information database 11 comprising map information data 3 as has been described above. Due to the similarities with the description above, this will not be described again.

Figure 5:
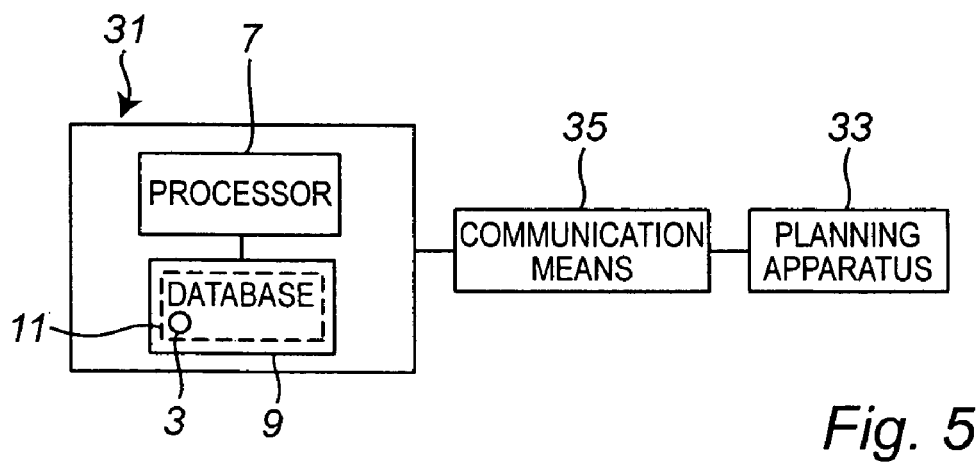
FIG. 5 schematically presents yet another embodiment of a device for providing map information data to a planning apparatus for planning at least one of locations of society facility and travel routes is disclosed.

In FIG. 5, another preferred embodiment, a device 31 is disclosed for providing map information data 3 to a planning apparatus 33 for planning at least one of locations of society facility and travel routes. The device 31 comprises a processor 7 and a memory 9 comprising a map information database 11. The map information database 11 comprises map information data 3 representing geographical features. The map information data 3 is based on aggregations of at least one of nodes 15, links 17 and rings 19, each one of which corresponding to geographic features, offering a number of resolution levels. The map information data 3 of a higher resolution level comprises additional map information data 3, resulting in more detailed map information, compared to the map information data 3 of a lower resolution level. The map information data 3 of a higher resolution level is generated by enhancement of the map information data 3 of a lower resolution level combined with additional data. The enhancement is based on disaggregation of at least one of the nodes 15, links 17 and rings 19. The device 31 also comprises communication means 35 for communicating the map information data 3 to the planning apparatus 33. In this embodiment the communication means 35 is constituted by one of a data communication network, such as the internet, and a floppy disk stations-floppy disk arrangement.

The processor 7 is configured for:

receiving from the user a request for map information data 3;

providing to the planning apparatus 33, in the case of the request being a first request, map information data 3 at a predetermined resolution level and, in the case of the request being subsequent request, map information data 3 at a higher resolution level.

Now turning to the map information data 3 at the different resolution levels as it is used by the device 1 and the device 31, a simple example of the disaggreagation of map information data 3 covering four resolution levels is presented in FIGS. 6A, 6B, 6C and 6D.

Figure 6A:
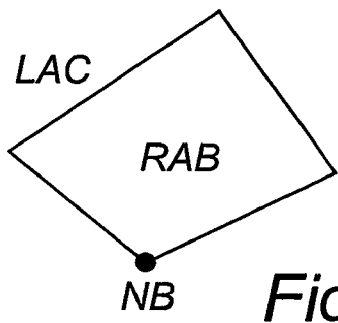
FIGS. 6A, 6B, 6C and 6D schematically present a map comprised in the database at different resolution levels.

In FIG. 6A the example of map information data 3 is presented at the lowest resolution level. Using the node, link and ring approach the information presented in FIG. 6A will consist of the following structural aggregation.

Node NB (point=<coordinate>)
    Link    LAC    (startNode=NB,    endNode=NB, breakpoints=<coordinate>, . . . )
    Ring RAB (links=LAC)

These objects are completely defined in the low-resolution geodata including coordinates and reference each other.

Figure 6B:
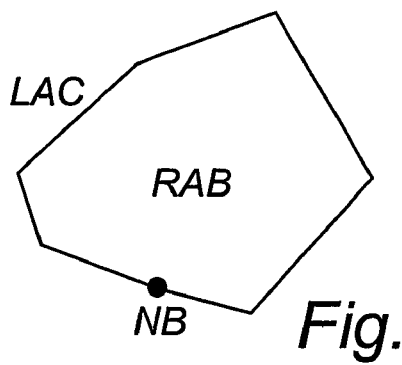

In FIG. 6B, the map information data 3 presented in FIG. 6A is presented with a higher resolution level compared to the map information data 3 presented in FIG. 6A. Using the function of link enhancement leads to a disaggregation of the map information presented in FIG. 6A to the map information presented in FIG. 6B.

LinkEnhance    (link=LAC waveletParameters=<numbers>)

Thus the function link enhancement enhances the resolution of the link LAC. This is done by one step of the inverse wavelet transform (or similar to multi-resolution transform) using the old breakpoints as the low frequency parameters and the enclosed wavelet parameters as the high frequency component. This creates new breakpoints that closer describe the correct link.

Figure 6C:
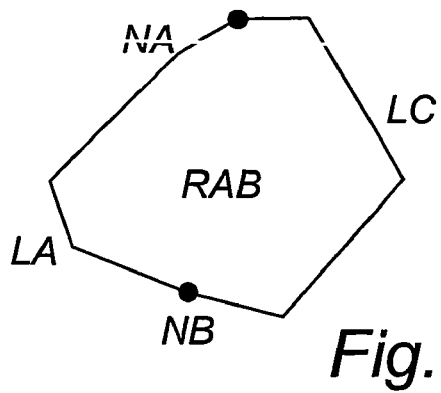

In FIG. 6C the map information data 3 presented in FIG. 6B is presented with a higher resolution level compared to the map information data 3 presented in FIG. 6B. Using the function of link clipping, the link LAC is divided to two sub links, LA and LC. This also leads to the formation of the node NA.

Node NA (point=<coordinate>)
    LinkClip (link=LAC afterBreakPoint=2 node=NA)

Thus, clip link LAC after the breakpoint and connect the new links (LA and LC) to the new node NA. Since the ring RAB referenced LAC was clipped, it must be updated to reference LA and LC instead.

Figure 6D:
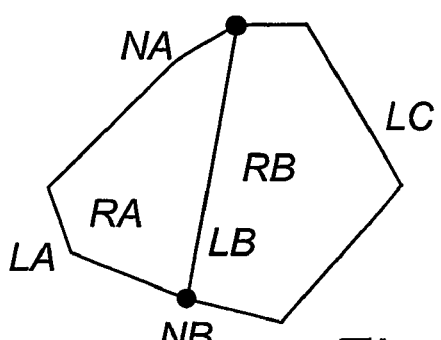

In FIG. 6D, the map information data 3 presented in FIG. 6C is presented with a higher resolution level compared to the map information data 3 presented in FIG. 6C. Using the function of ring splitting, the ring RAB of FIG. 6C is divided into two sub rings, RA and RB.

Link    LB    (startNode=NA,    endNode=NB, breakpoints=<coordinate>, . . . )
    RingSplit (ring=RAB link=LB)

Thus, this splits ring RAB at the new link LB and creates the two new rings RA and RB. The example above could in the highest resolution for instance represent two areas of forest, one with broad-leaf trees and one with coniferous trees. At the lower resolution the two areas are aggregated and represent just forest. In FIGS. 6B to 6D, the intermediate resolution levels that are at least calculated, but not necessarily provided to the display unit, to receive the next resolution level.

The invention claimed is:

1. Device for providing map information data interactively to a display unit operated by a user;

the device comprising a processor and a memory comprising a multi-resolution map information database;

the multi-resolution map information database comprising map information data representing geographical features, the map information data being based on aggregations of at least one of nodes, links and rings, each one of which corresponding to geographical features, offering a number of resolution levels, where the map information data of a higher resolution level comprises additional map information data, resulting in more detailed map information presented on the display unit, compared to the map information data of a lower resolution level, and the map information data of a higher resolution level being generated by enhancement of the map information data of a lower resolution level combined with the additional data, the enhancement being based on disaggregation of at least one of the nodes, links and rings;

the processor being configured for:

receiving from the user a request for map information data;

providing to the display unit, in the case of the request being a first request, map in formation data at a predetermined resolution level and, in the case of the request being subsequent request, map information data at a higher resolution level.

2. Device according to claim 1, wherein the predetermined resolution level corresponds to the lowest resolution level.

3. Device according to claim 1, wherein the processor is further configured for, in the case of the request being another subsequent request, providing map information data at a lower resolution level.

4. Device according to claim 1, wherein, in the case of the request being subsequent request, the difference in resolution level between a presently provided map information data and a previously provided map information data is 1, or greater than 1.

5. Device according to claim 1, further comprising communication means and wherein the memory comprising the multi-resolution map information database is remotely located and accessible using the communication means.

6. Device according to claim 1, further comprising communication means and wherein the multi-resolution map information database is arranged in memories at two locations, in which lower resolution levels are arranged in one memory and higher resolution levels are arranged in the other memory.

7. Device according to claim 1, wherein the display unit is constituted by a computer screen.

8. Device according to claim 1, further comprising communication means between the device and the display unit, and the display unit being constituted by one of a cell phone, personal digital assistant (PDA), and a navigator.

9. Device for providing map information data to a planning apparatus for planning at least one of locations of society facility and travel routes;

the device comprising a processor and a memory comprising a multi-resolution map information database;

the map multi-resolution information database comprising map information data representing geographical features, the map information data being based on aggregations of at least one of nodes, links and rings, each one of which corresponding to geographic features, offering a number of resolution levels, where the map information data of a higher resolution level comprises additional map information data, resulting in more detailed map information, compared to the map information data of a lower resolution level, and the map information data of a higher resolution level being generated by enhancement of the map information data of a lower resolution level combined with the additional data, the enhancement being based on disaggregation of at least one of the nodes, links and rings;

the processor being configured for:

receiving from the user a request for map information data;

providing to the planning apparatus, in the case of the request being a first request, map information data at a predetermined resolution level and, in the case of the request being a subsequent request, map information data at a higher resolution level.

* * * * *

UNITED STATES PATENT AND TRADEMARK OFFICE
CERTIFICATE OF CORRECTION

PATENT NO. : 7,269,510 B2 Page 1 of 1
APPLICATION NO. : 10/502134
DATED : September 11, 2007
INVENTOR(S) : Johan Persson It is certified that error appears in the above-identified patent and that said Letters Patent is hereby corrected as shown below:

On the Title Page:
Item (73), "Gothenburg" should read -- Göteborg --.

Item (30), "0200167" should be -- 0200167-5 --.

At Column 8, line 24, "in formation" should be -- information --.

Signed and Sealed this

Twenty-third Day of December, 2008

JON W. DUDAS
*Director of the United States Patent and Trademark Office*